US005909349A

United States Patent [19]

Brower et al.

[11] Patent Number: 5,909,349

[45] Date of Patent: Jun. 1, 1999

[54] GAS TUBE SURGE PROTECTOR WITH SNEAK CURRENT PROTECTION

[75] Inventors: Boyd G. Brower, Keller; John J. Napiorkowski, Irving, both of Tex.

[73] Assignee: Siecor Corporation, Hickory, N.C.

[21] Appl. No.: 08/995,208

[22] Filed: Dec. 19, 1997

Related U.S. Application Data

[63] Continuation-in-part of application No. 08/881,422, Jun. 24, 1997.

[51] Int. Cl.[6] ........ H02H 1/00

[52] U.S. Cl. ........ 361/117; 361/111; 361/118; 361/120

[58] Field of Search ........ 361/117, 56, 58, 361/91, 118, 119, 120, 124, 103, 127

[56] References Cited

U.S. PATENT DOCUMENTS

| | | | |
|---|---|---|---|
| 4,584,622 | 4/1986 | Crosby et al. | 361/56 |
| 4,628,394 | 12/1986 | Crosby et al. | 361/56 |
| 4,876,621 | 10/1989 | Rust | 361/58 |
| 4,876,713 | 10/1989 | Crosby et al. | 379/412 |
| 4,903,295 | 2/1990 | Shannon et al. | 379/437 |
| 4,944,003 | 7/1990 | Meyerhoefer et al. | 379/412 |
| 5,008,772 | 4/1991 | Neawirth et al. | 361/119 |
| 5,383,085 | 1/1995 | Boy et al. | 361/119 |
| 5,388,023 | 2/1995 | Boy et al. | 361/129 |
| 5,410,596 | 4/1995 | Shannon et al. | 379/412 |
| 5,500,782 | 3/1996 | Oertel et al. | 361/120 |

*Primary Examiner*—Richard T. Elms
*Assistant Examiner*—Stephen Jackson

[57] ABSTRACT

A gas tube protector module is provided that provides sneak current protection in addition to voltage surge protection. The module has two pairs of terminals with one pair for connection to outside plant and the second pair for connection to the inside wiring. The module has a gas tube with leads connected to the first pair of terminals. Positive temperature coefficient (PTC) resistors are disposed electrically between the lead and the second pair of terminals such that the PTCs are in series between the outside plant and the inside wiring.

9 Claims, 4 Drawing Sheets

GAS TUBE SURGE PROTECTOR WITH SNEAK CURRENT PROTECTION

CROSS REFERENCE TO RELATED APPLICATION

This application is a continuation-in-part of U.S. Ser. No. 08/881,422, now pending, filed on Jun. 24, 1997, the disclosure of which is incorporated herein by reference.

TECHNICAL FIELD OF THE INVENTION

The present invention relates to surge protectors for use in telecommunications lines. In one aspect, the present invention relates to a gas tube protector that incorporates positive temperature coefficient resistors (PTCs) to protect against sneak currents.

BACKGROUND OF THE INVENTION

Gas tube protectors are commonly used to protect telecommunication lines from electrical surges. Since gas tube arresters need to be hermetically sealed to perform the protection function, there is the possibility that the gas will vent from the arrester resulting in a much higher breakdown voltage than originally intended and rendering the gas tube unable to protect. To provide for continued protection should venting occur, arresters are provided with back up protection in the form of an air gap or with a solid state device, for example, a metal oxide varistor (MOV).

U.S. Pat. No. 5,388,023 discloses a gas tube protector with one or two MOVs used as a back up. A gas tube protector with a back up device is sometimes referred to as "vent safe." In such protectors, the gas tube is sometimes termed the "primary protector." Gas tubes are widely used as primary protectors because of their ability to repeatedly divert large surge currents to ground and remain functional to protect.

Because it is desired that the gas tube and not the back up divert surges to ground, the operate voltage of the MOVs are set higher than the operate voltage of the gas tube. The '023 patent discloses "5 to 10% or else between 10 and 40% above the response voltage of the overvoltage arrestor." With the response voltage of the MOVs set in such a range, the MOVs are intended to only divert surges if the gas tube has vented. In normal operation, the gas tube alone is intended to divert surges to ground. The '023 patent defines the response voltage of the MOV as the voltage at which the varistor conducts a current of 1 mA.

U.S. Pat. No. 5,500,782 also discloses the use of a MOV with a gas tube with the clamping voltage of the MOV above the breakdown voltage of the gas tube. While the '782 patent uses the term "hybrid" to describe the disclosed protector arrangement, the MOVs are used as a back up protection device in the event that the gas tube should vent. The '782 patent teaches that the 1 mA clamping voltage of the MOV is selected to be just above the upper tolerance of the DC breakdown voltage of the gas tube so that the gas tube acts as the primary surge protector and the MOV provides back up protection in case the gas discharge tube fails to operate properly.

MOVs are preferred over traditional air gaps because they have a more repeatable clamping voltage than air gaps in response to fast rising voltage transients and they are not susceptible to contamination and moisture like the air gap.

One drawback of gas tubes as protectors is their ionization time which contributes to a higher peak surge voltage, or impulse breakdown voltage. The DC breakdown voltage of a gas tube is the voltage at which a gas tube will ionize when the voltage is increased slowly, for example, 100 volts per second. By raising the voltage slowly enough such that the ionization time of the gas tube is taken into account, the DC breakdown voltage of the gas tube can be determined. If the voltage is a surge voltage, for example, 100 volts per microsecond, the gas tube will breakdown at a voltage predominantly higher than its DC breakdown voltage because of the ionization time of the gas tube. This higher voltage is termed "surge breakdown voltage" or "impulse breakdown voltage." It is possible that the impulse breakdown voltages of the gas tubes are sufficiently high that there could still be a shock to a person that is in contact with the circuit at the time of the surge. Therefore, it is possible to have personnel injury and/or equipment damage from a gas tube protected circuit.

Therefore a need exists for a telecommunications protector with a robust gas tube protector as the primary protector but that is "assisted" by a secondary protector against fast surges to lower the impulse voltage. A further need exists for a protector where the secondary protector is capable of acting as a back up should the gas tube vent.

Another drawback of gas tubes is that there are wide variances of the DC breakdown voltages among gas tubes of the same type and made by the same manufacturing process. This variance is much wider than the variances for other components such as MOVs and fusible elements. Thus a need exists for a gas tube protector with a secondary protector that lowers the impulse voltage and that takes into account the wide range of DC breakdown voltages across a population of gas tube of the same type.

Both the '023 and '782 patents disclose incorporation of "fail safe" arrangements in the protector to short to ground any surges that overheat the protector. One drawback of the '782 patent arrangement is its bulkiness. The MOVs are spaced from the gas tube and arranged in a manner that takes up more space than the arrangement in the '023 patent which compactly locates two MOVs on opposite ends of the gas tube while still incorporating a thermal overload short to ground arrangement. Either one of the MOVs alone or the gas tube alone if overheated will melt the thermal element in the '023 arrangement to short to ground. Also, the MOVs in the '782 patent are not of sufficient size to impact the surge voltage under normal operating conditions.

In addition to protecting against voltage surges, it is also sometimes desired to protect against sneak currents for certain applications. A sneak current is typically defined as a current that is induced by a voltage below the activation voltage of the primary protector. Such a sneak current can damage some types of equipment by overheating heat sensitive components in the equipment. Typically, protection against sneak currents has been more of a concern at the telephone company central offices, and protecting against sneak currents at the subscriber's location (station protection) has not been emphasized. However, sneak currents are possible at the subscriber location, and because of the increase in the use of more sophisticated consumer equipment that is susceptible to damage by sneak currents, the need for protection from sneak currents at the subscriber is increasing.

One known way to protect against sneak currents at the central office is to use heat coils. U.S. Pat. Nos. 4,944,003 and 5,008,772 disclose the use of heat coils to protect against sneak currents. Because heat coils are based on a mechanical action in reaction to a build up of heat, there are inherent reliability problems in the assembly and construction of the heat coils. For example, heat coils typically require soldering in their construction which is especially susceptible to creep, contamination, and other problems. Another drawback of heat coils is that after they have reacted to a sneak current, they permanently go to ground and must be replaced. Replacement requires disposal of the entire protector module that contains the PTC. While having to replace a module is not desirable at any location, such replacement is easier at the central office where personnel are commonly located as opposed to having to send repair personnel to the side of a subscriber's home.

It is also known to use positive temperature coefficient (PTC) resistors to protect against sneak currents. These are preferred over heat coils in that they operate as a function of their material makeup and not by any mechanical action. However, protectors using PTCs typically have only a solid state primary protector and thus the overall protector suffers from the same drawbacks as discussed for solid state protectors. Therefore a need exists for a protector that protects against sneak currents but still has the desired robustness and responsiveness to voltage surges.

In addition to sneak currents, the subscriber location is also susceptible to other conditions that may cause an excessive current on inside wiring. For example, some consumer devices used inside the home have secondary protectors that will short to ground before the telephone protector on the side of the house. If lightning were to strike the phone line outside, the secondary protector would short the strike to ground before the outside protector and create excessive currents on the inside wiring. In another example, consumers may improperly wire some additional inside wiring such that a near short-to-ground is created in the home that also might attract the lightning surge into the home and create excessive currents on the inside wiring. Therefore a need exists for a protector that can protect a subscriber's inside wiring from excessive currents caused by means other than sneak currents.

Station protectors used at the subscriber location have commonly accepted sizes and footprints to provide some interoperability among station protectors and the network interface devices (NIDs) that house them. The common station protectors typically have only two terminals as the protector is in parallel between the outside plant line and the inside wiring. The amount of space in the standard station protection packaging is limited. Therefore a need exists for a station protector that is able to accommodate PTCs in existing station protection packaging.

SUMMARY OF THE INVENTION

One aspect of the present invention provides a telecommunications equipment surge protector that has a gas tube protector as the primary protector with MOVs that interact with the gas tube to divert surges to ground. More specifically, a surge protector for protecting people and telecommunications equipment from overvoltage surges is provided that comprises a gas tube of a particular type that has a DC breakdown voltage that varies from gas tube to gas tube due to manufacturing and component variances. The gas tube has a DC breakdown voltage within a range of DC breakdown voltages between a maximum DC breakdown voltage and a minimum DC breakdown voltage set for a population of the type of gas tubes. The protector further comprises at least one MOV arranged in parallel with the gas tube. The clamping voltage of the MOV at 1 mA being set between the maximum DC breakdown voltage and the minimum DC breakdown voltage such that the MOV will lower the impulse breakdown voltage of the gas tube yet not burn out in response to surge voltages whether the gas tube has the maximum DC breakdown voltage or the minimum DC breakdown voltage.

In another aspect of the present invention, a surge protector for protecting telecommunications equipment and people is provided that comprises a gas tube that has a DC breakdown voltage and that is generally cylindrical with line electrodes at opposite ends of the cylinder. An MOV is located outside of each end of the gas tube and arranged electrically in parallel with the line electrodes. A clip bears axially inward to maintain the MOVs in position at the ends of the gas tube. The clamping voltage of the MOV at 1 mA is coordinated with the breakdown voltage of the gas tube such that the MOV will lower the impulse breakdown voltage of the gas tube in response to a surge voltage. In accordance with another embodiment of the present invention, a surge protector module is provided for protecting telecommunications equipment and for connection between outside plant and inside wiring. The module comprises a housing having a first pair of terminals for connection of outside plant wiring and a second pair of terminals for connection of inside wiring. A three element gas tube located in the housing. There are two leads with each having a first end connected to the gas tube and a second end connected to a respective one of the terminals of the first pair. At least one MOV is connected electrically in parallel with the gas tube. At least one PTC resistor is located in electrical contact between a respective one of the leads and a respective one of the terminals of the second pair.

DETAILED DESCRIPTION OF THE PREFERRED EMBODIMENT

Figure 1:
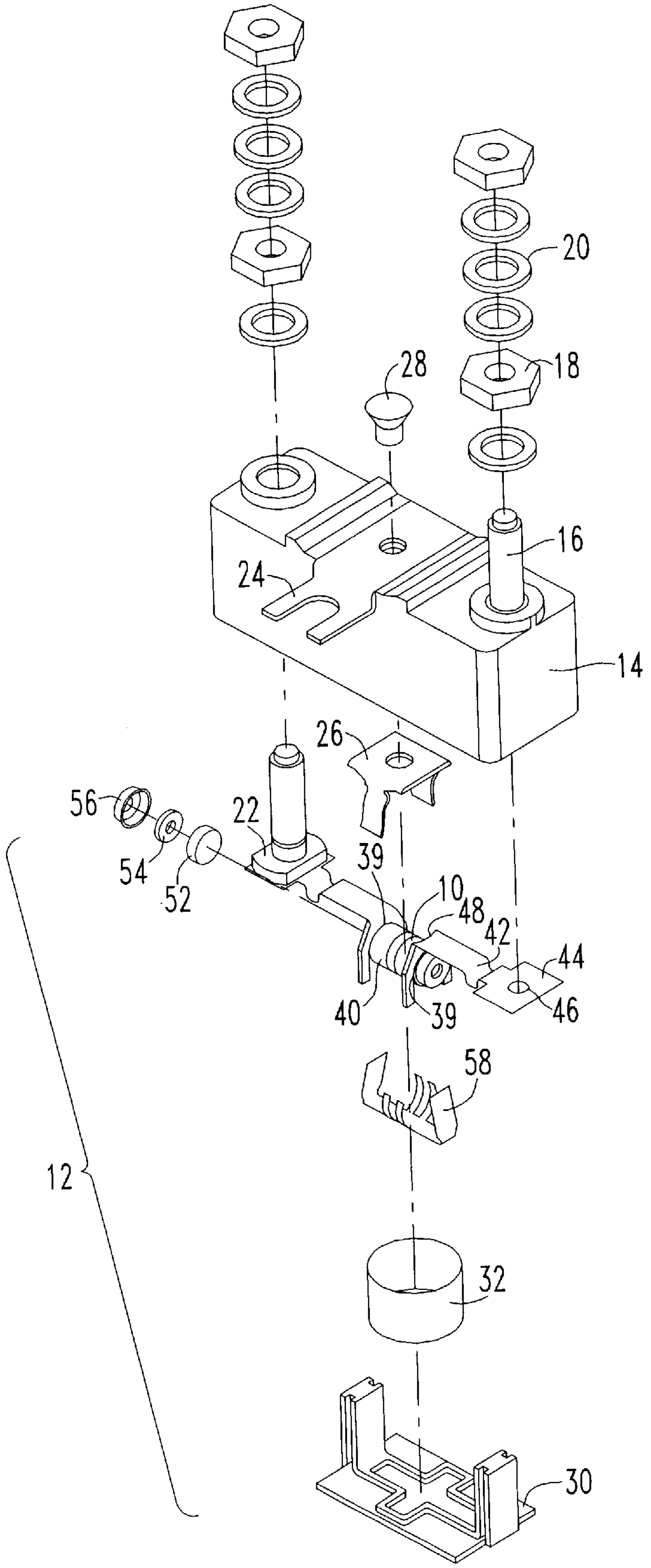
FIG. 1 is an exploded perspective view of a protector module application that incorporates the preferred embodiment of the protector assembly of the present invention.

With reference to FIG. 1, one application for use of protector assembly 10 of the present invention is shown as protector module 12. Module 12 is commonly referred to as a station protection module and is used in network interface devices (NIDs) on the side of a telephone subscriber's residence to protect the telephone lines and equipment at the subscriber from being damaged by surges caused, for example, by lightning or power crosses. It should be understood that protector assembly 10 can be adapted for use in other telecommunications applications and packaging, for example, being incorporated in a PTD® module as disclosed in U.S. Pat. No. 5,333,193 and others.

The footprint and exterior features of module 12 are known in the art. Module 12 generally has housing 14 through which extend studs 16 which have nuts 18 and washers 20 which is known in the art for attaching telephone lines. Insulation displacement terminals could be used instead of the stud and nut terminals.

Studs 16 have heads 22 which are electrically connected to leads 42 which in turn are electrically connected to the line electrodes 39 of gas tube element 40 of protector assembly 10. Assembly 10 is also in contact with ground bracket 24 through mount 26 and rivet 28, and assembly is intended to conduct any surges to ground bracket 24 which is to be connected to earth ground. Module 12 is closed by cover 30. Flexible band 32 can be placed around assembly 10 for added support against shocks from handling, shipping and during installation. Leads 42 are identical in the preferred embodiment and have first end 44 which has hole 46 for facilitating riveting/soldering of one of the studs 16 used in this application thereto. Leads 42 have second end 48 opposite first end 44 that is attached to protector element 40. The structure of leads 42 and their engagement with element 40 is fully disclosed in U.S. Ser. No. 08/881,486 entitled "Surge Protector and Lead Assembly with Improved Contact Surface Area Between the Protector and Lead" filed concurrently herewith and assigned to the assignee of the present application and same is incorporated herein by reference. The manner of attachment of leads 42 to the gas tube and to the studs is not part of the present invention.

Figure 3:
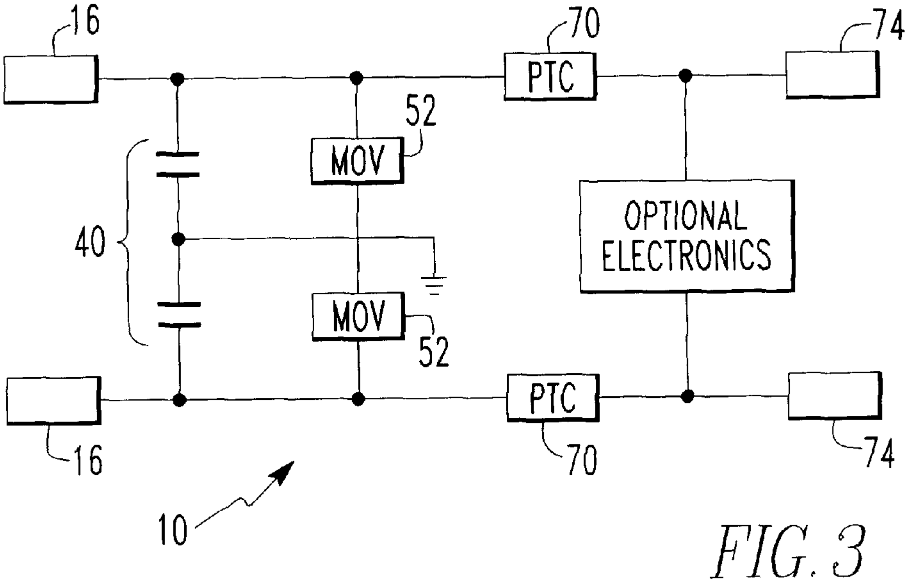
FIG. 3 is a circuit diagram of another embodiment of the present invention incorporating PTCs.

The arrangement of the components of assembly 10 is known and disclosed in U.S. Pat. No. 5,388,023 and available commercially from Siemens. The '023 patent is incorporated herein in its entirety. The arrangement of assembly 10 of the present invention is generally the same as the right side of FIG. 1 of the '023 patent applied to both sides of the protector. That is, the present invention uses an MOV on both sides of the gas tube instead of a spacer on one side and an MOV on the other as shown in FIG. 1 of the '023 patent. With reference to FIG. 1 of the present application, there is gas tube element 40, two metal oxide varistors (MOVs) 52, fusible elements 54 and end caps 56 all maintained in place by clip 58. The differences between the preferred arrangement of FIG. 1 and the right side of FIG. 1 of the '023 patent applied to both sides of a gas tube are the following (reference numerals that follow are those of the '023 patent): 1) there is no rubber ring 24 as shown in the '023 patent because end cap 15 is made slightly conical to prevent contact as it disclosed as an alternative in the '023 patent; 2) the ends of arms 13 of clip 10 do not have a hole coinciding with the hole in end caps 15; 3) the centrally arranged clamp 11 of clip 10 is instead forked to contact the sides of center electrode 1; 4) connecting wires 6 and 7 are eliminated and replaced with the leads shown in FIG. 1 herein and that are the subject of the above referenced co-pending application, and 5) a flexible band is placed around the preferred arrangement to help the assembly withstand impacts from being dropped, etc. Other than these primary differences, reference is made to the '023 patent for further explanation of these components. As an alternative arrangement, fusible element 54 can be placed between the gas tube and the MOV as shown in FIG. 3 of the '023 patent.

The present invention incorporates the thermal overload short to ground features of the '023 patent. Specifically, when fusible element 54 reaches the temperature at which it melts, an end cap 56 is biased axially inward by clip 58 and contacts an end electrode of the gas tube element 40. The signal then travels through clip 10 to the center ground electrode to divert the surge to ground. In the preferred embodiment, a fusible element is chosen that melts at around 203 degrees Fahrenheit.

While the present invention incorporates the general component arrangement of the '023 patent, the present invention coordinates the surge protection qualities of the gas tube and the MOVs in a different manner to achieve a coordinated protector where the MOVs interact with gas tubes with a range of DC breakdown voltages to divert surges to ground instead of merely acting as a substitute air gap as disclosed in the '023 patent. With the gas tube and MOV elements interacting, better surge response is achieved.

Gas tube element 40 by its nature is difficult to repeatedly manufacture with a precise DC breakdown voltage. As a result, for a population of gas tube elements 40, the DC breakdown voltage varies across a range that is wider than ranges for the other components which are move amenable to consistent manufacture. Accordingly, for a particular gas tube type and manufacturing type, an acceptable range of DC breakdown voltage for gas tubes of that type is determined and a minimum and a maximum DC breakdown voltage are selected to define the range. Part of the manufacturing process for the gas tube type is to test each gas tube and only pass those gas tubes that fall between the selected minimum and maximum breakdown voltages for that particular gas tube type and thereby create a population of gas tubes of the same type that fall within the minimum and maximum DC breakdown voltages. If the range is too small, then too large of a percentage of gas tubes that are manufactured are not being used and thus wasted. If the range is too large, then the ability to properly coordinate the MOVs with any gas tube in the range becomes more difficult.

As discussed above, the DC breakdown voltage is the voltage at which a gas tube breaks down and diverts electricity to ground when the rate of rise of the voltage is sufficiently low such that the ionization time of the gas tube is not exceeded. When the rate of rise of voltage rises to surge levels, the gas tube breaks down at an impulse voltage breakdown voltage that is higher than the DC breakdown voltage because the ionization time of the gas tube allowed the voltage to rise above the DC breakdown voltage level before the gas tube could divert the surge. The impulse breakdown voltage of the gas tube varies as a function of the rate of rise of the voltage. The time it takes for a gas tube to operate is commonly termed its "operate time."

The MOVs on the other hand clamp voltages and prevent them from getting too high. In a protector with MOVs only, if the surge is too high for the MOV to clamp the MOV may burn out and the thermal overload short to ground feature would operate to prevent damage to people and equipment. MOVs are immediate and are not rate of rise dependent like the gas tube. Instead, an MOV's clamping voltage is a function of current. As current increases, the clamping voltage of the MOV increases.

When a MOV is combined with a gas tube so that the MOV acts as a replacement for an air gap back up, the MOV's clamping voltage is sufficiently higher than the gas tube's DC breakdown voltage that the impulse breakdown voltage of the gas tube is not appreciably affected. However, the present invention lowers the clamping voltage of the MOV relative to the DC breakdown voltage of the gas tube so that the MOV will clamp surges during the ionization time of the gas tube thereby lowering the impulse voltage of the gas tube.

However, even gas tubes made on the same manufacturing line have a wide range of DC breakdown voltages. The present invention takes into account the range of DC breakdown voltages of gas tubes by setting the MOV clamping voltage at a point to achieve optimal coordination between the MOV and any gas tube in the range of DC breakdown voltages to balance two competing objectives:

1) lower the impulse breakdown voltage below that of a gas tube alone for any gas tube in the population, yet 2) allow the gas tube to protect the MOV from being burned out for any gas tube in the population.

If the MOV is set too high, there may be some gas tubes at the low end of the range where the impulse breakdown voltage will not be lowered and the MOV operates merely as a substitute air gap. If the MOV is set too low, a risk develops that the MOV could be burned out before the gas tube can divert the surge to ground if the MOV is matches with some gas tubes at the high end of the range of gas tubes.

In the preferred embodiment, the difference between the minimum and maximum DC breakdown voltage of gas tube element 40 is about 115 volts to about 155 volts and more preferably about 135 volts. Preferably the minimum DC breakdown voltage is about 265 volts with the maximum DC breakdown voltage being about 400 volts. The operate time of the gas tube is between about 1 to about 20 microseconds.

In the preferred embodiment, the clamping voltage of the MOV at 1 mA is set in the middle 60% of the range of the DC breakdown voltages and more preferably is set at about the 45% point in the range of the DC breakdown voltages. In the preferred range of DC breakdown voltages of 265 to 400, the clamping voltage of the MOV is preferably between about 300 volts and about 330 volts. It has been found that in these preferred ranges, the MOV can be selected to be a clamping voltage that will lower the impulse voltage of a gas tube with a DC breakdown voltage at 265 volts and yet will not burn out when matched with a gas tube with a DC breakdown voltage of 400 volts.

Figure 2:
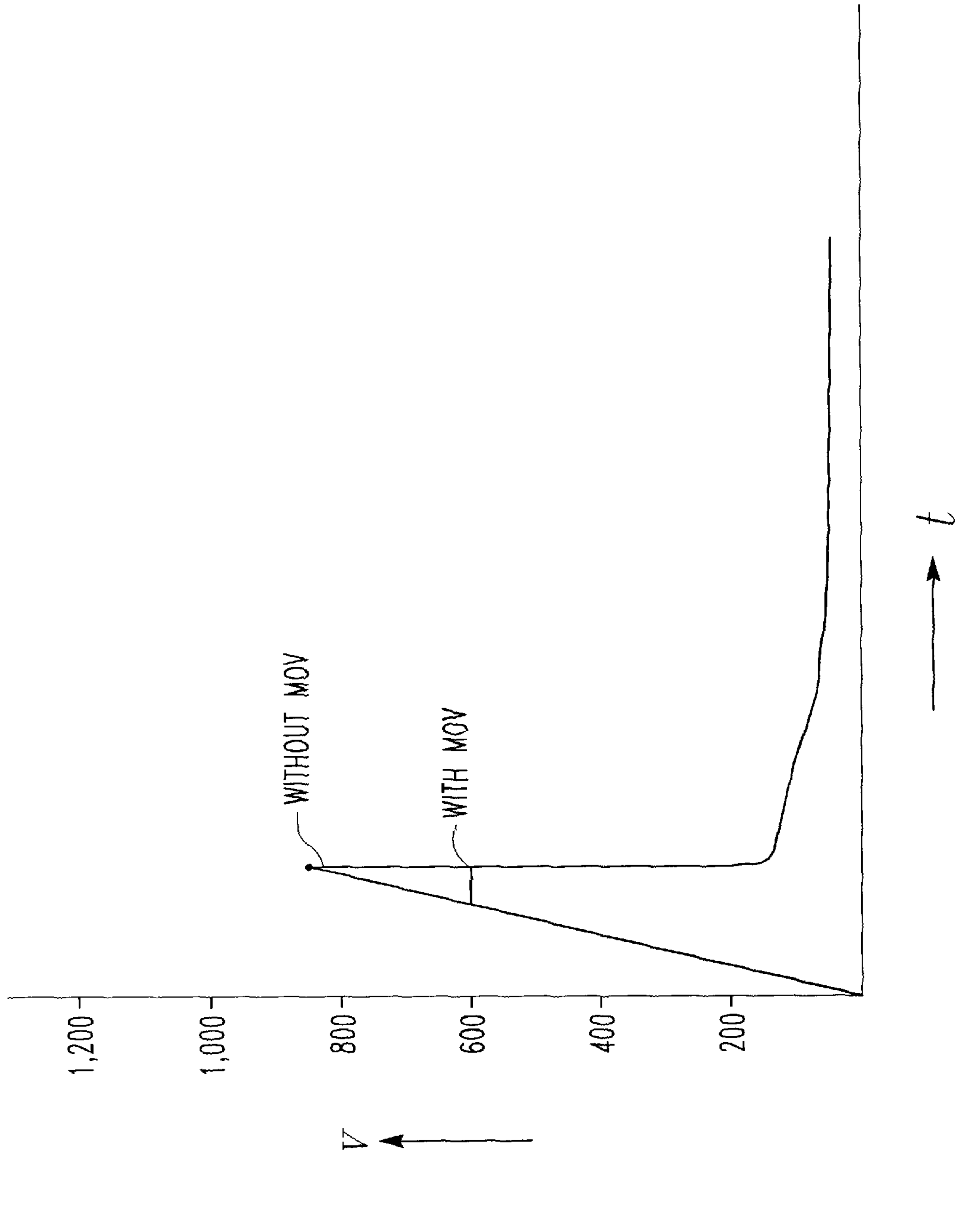
FIG. 2 is a chart illustrating the interaction of the MOVs and gas tube in responding to a surge.

As an example, a Siemens gas tube T44-C350 was used in the arrangement of the right side of FIG. 1 of the '023 patent applied to both ends with two Siemens Z40-230 MOVs. After subjecting the protector to a 10 kV/μs surge, the MOVs and the gas tube had breakdown voltages of 743 on the ring side and 729 on the tip side. In comparison, when subjecting the same gas tube without the MOV to the same surge, it was found that the breakdown voltages were 806 for the ring side and 777 for the tip side. FIG. 2 illustrates how the MOV acts to lower the impulse breakdown voltage by clamping the surge until the gas tube has time to respond.

Figure 5:
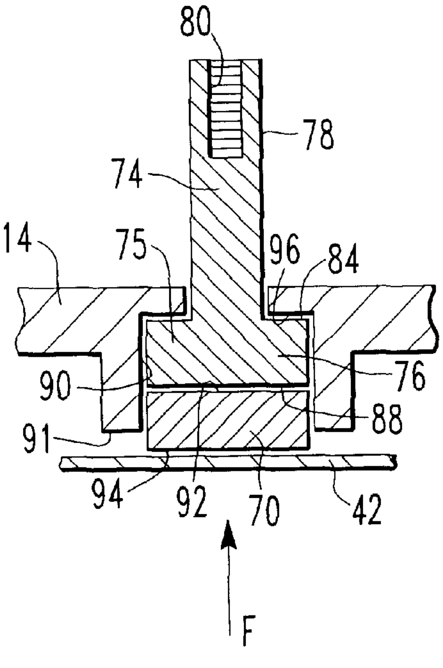
FIG. 5 is a cross-section of the interface between the PTC, the contact and the lead of the embodiment of FIG. 4.
Figure 4:
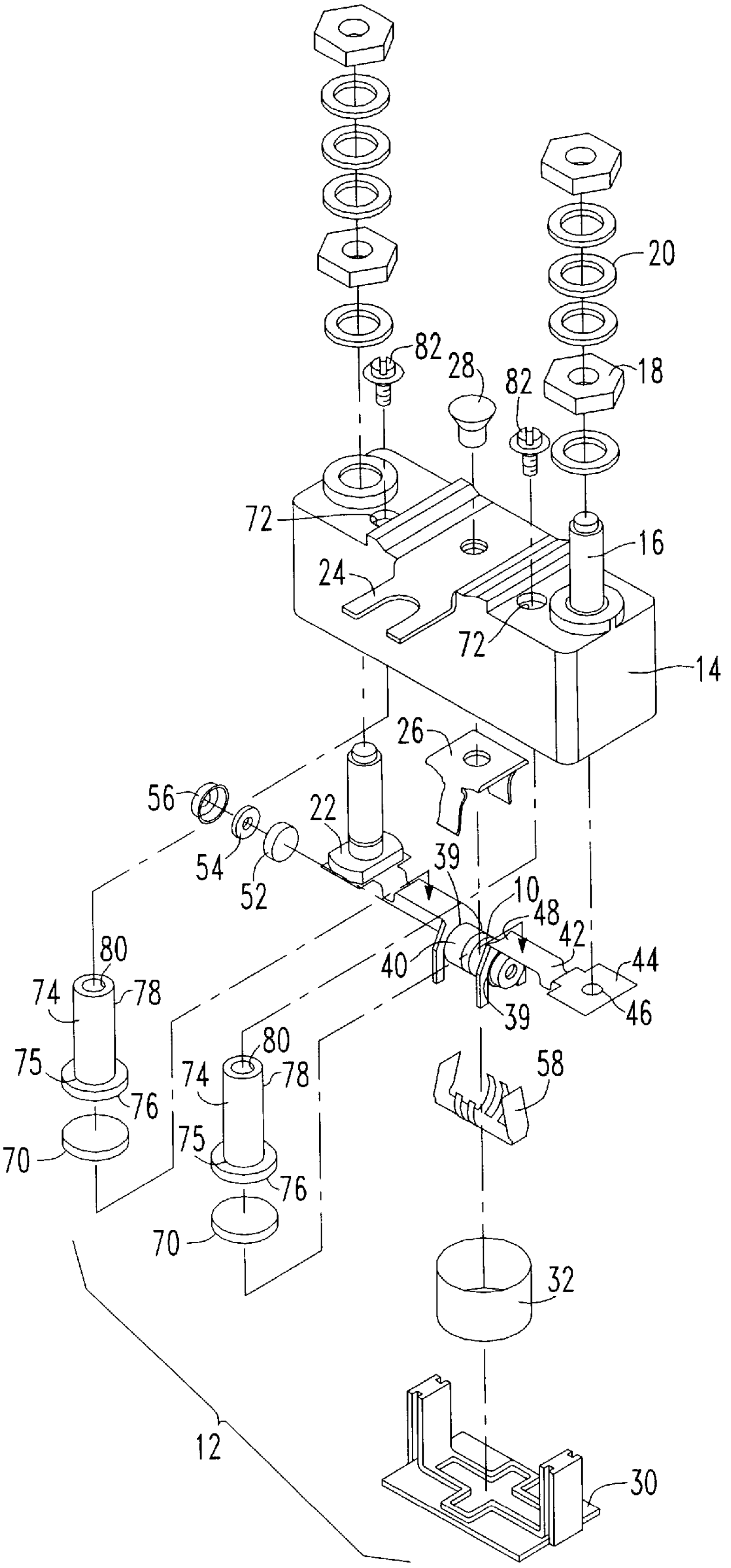
FIG. 4 is an exploded perspective view of the embodiment of FIG. 3 incorporated in a protector module application that incorporates an alternative embodiment of the protector assembly of the present invention.

FIGS. 3–5 show an additional embodiment that incorporates positive temperature coefficient resistors (PTCs) 70 with the primary gas tube protector element 40 and the interacting MOVs 52 of the first embodiment. A PTC resistor has a low impedance at normal operating parameters. It is sensitive to current, and its temperature rises as the current rises. The level of current needed to cause the temperature to rise can be varied to some extent by the metallurgical or chemical make up of the resistor. The resistance increases exponentially as the temperature increases resulting in orders of magnitude of higher impedance. This blocks the sneak current. Once the sneak current is removed, the PTC cools down and its impedance returns to its original low level.

With reference to FIG. 3, two PTCs 70 are placed in series on the protected side of the circuit. With this combination, protector 10 protects against surge voltages with the robust gas tube element 40 and interacting MOVs 52, has the MOVs doubling as a back up in the event the gas tube vents, has a thermal overload fail safe, and has the PTCs to protect against sneak currents and other currents that potentially could be induced into the inside wiring. While it is preferred that the PTCs be used in a protector of the type disclosed herein with interacting MOVs, the PTCs may also be used where the MOVs act merely as a back up to the gas tube. The preferred PTC for this embodiment is a 6 ohm value PTC available from Control Devices.

With reference to FIGS. 4–5, the incorporation of PTCs into the arrangement like that of FIG. 1 is shown. The addition of the two PTCs in series requires that two additional terminals and the PTCs themselves be incorporated into the protector module. The preferred embodiment of this aspect of the invention incorporates the two PTCs and the two additional terminals in a conventional station protector package as shown in FIG. 4. Two additional holes 72 are defined in housing 14 and contacts 74 are inserted therethrough from inside of housing 14. Each contact 74 has first end 75 with base portion 76 that is larger than hole 72 to retain contact 74 in housing 14. With reference to FIG. 5, base portion 76 has base shoulder 84 that is disposed against cavity shoulder 96 of cavity 90 defined in housing 14. Each contact 74 also has second end 78 that extends outside of housing 14. Second end 78 defines threaded bore 80 therein to receive screw 82 therein. Inside wiring, or subscriber wiring, is connected to contacts 74 by screw 82. It should be understood that contacts 74 may be any of a variety of designs and the depicted design is merely exemplary of one such design. Alternatively, various types of insulation displacement connectors may be used.

Contacts 74 are located such that base portion 76 is disposed over leads 42. Housing 14 defines cavity 90 that receives base portion 76 and PTC 70 thereunder. Base portion has contact surface 88 in contact with PTC 70. PTC 70 is generally disk shaped and sized to be received in cavity 90. Preferably, the height of PTC 70 is such that PTC 70 protrudes beyond bottom edge 91 of cavity 90. PTC 70 has first side 92 and second side 94 opposite thereto. First side 92 contacts contact surface 88. Second side 94 contacts lead 42. Due to the flexibility of lead 42, contact 74 and PTC 70 are sized such that there is a bias force F against the PTC to retain the PTC in place in cavity 90. In such an arrangement there is no need for any leads to be connected to PTC 70. In other words, PTC 70 is sandwiched between contact surface 88 of base portion 76 and lead 42. Because PTCs 70 are to be placed in series between the outside plant wiring and the inside wiring, the extra set of terminals, contacts 74, is needed. By sandwiching the PTCs between the bottom of the contacts and leads 42, considerable space saving is achieved and the need to solder or otherwise connect leads to the PTCs is eliminated. However, solder and/or leads may be used in alternative arrangements. Additionally, this arrangement allows the PTCs to be readily incorporated into the standard station protection packaging.

Another advantage of the way the PTCs are incorporated into the arrangement of FIG. 1 is that if the PTCs reach a certain threshold temperature for a certain period of time, the heat will readily conduct along lead 42 to fusible element 54 thereby activating the thermal fail safe to ground.

For connection of wiring, outside plant wiring is connected to studs 16 as is known. If sneak current protection is desired for a specific location, the inside wiring is connected to contacts 74 thereby placing the PTCs in series between the outside plant and the inside wiring. If sneak current protection is not desired and it is not desired that the PTCs be in the circuit, the inside wiring can simply be connected to studs 16 as is known and the PTCs are not in the circuit. Thus, the arrangement of this embodiment gives the installer the option of including the PTCs in the circuit or not. If sneak current protection is later desired, the inside wiring can always be moved from studs 16 to contacts 74 at such time.

Although the present invention has been described with respect to a preferred embodiment, it should be understood that various changes, substitutions and modifications may be suggested to one skilled in the art and it is intended that the present invention encompass such changes, substitutions and modifications as fall within the scope of the appended claims.

We claim:

1. A surge protector module for connection between outside plant and inside wiring to protect inside wiring and equipment from surges and excessive currents, comprising:

(a) a housing having a first pair of terminals for connection of outside plant wiring and a second pair of terminals for connection of inside wiring;

(b) a three element gas tube located in the housing;

(c) two leads, each having a first end connected to the gas tube and a second end connected to a respective one of the terminals of the first pair;

(d) at least one MOV connected electrically in parallel with the gas tube; and (e) at least one PTC resistor located in electrical contact between a respective one of the leads and a respective one of the terminals of the second pair.

2. The module of claim 1 wherein the PTC is compressed between the respective terminal of the second pair and the respective lead by a spring force.

3. The module of claim 1 wherein there are two PTC resistors, each located in electrical contact between a respective one of the leads and a respective one of the terminals of the second pair.

4. The module of claim 1 further comprising at least one fusible element that will short to ground upon reaching a threshold temperature and wherein the PTC resistor is located such that heat from the PTC resistor is conducted along the lead to the at least one fusible element.

5. The surge protector module of claim 1, wherein the three element gas tube has an impulse breakdown voltage and a DC breakdown voltage, the DC breakdown voltage being in a range between a predetermined minimum and maximum value, and the impulse breakdown voltage being higher than the predetermined maximum DC breakdown voltage; and wherein the MOV has at 1 mA a clamping voltage between the predetermined minimum and maximum DC breakdown voltages of the gas tube, wherein the MOV clamps the voltage during a voltage surge to reduce the impulse breakdown voltage of the gas tube without the MOV burning out.

6. The module of claim 1 wherein the PTC is generally disk shaped with a first surface disposed in contact with the lead and a second surface opposite the first surface disposed in contact with the respective terminal of the second pair.

7. The module of claim 6 wherein the respective terminal has a base portion that is disposed inside the housing and the housing defines a cavity that receives the base portion and a portion of the PTC therein, the first surface of the PTC disposed outside of the cavity.

8. The module of claim 7 wherein the lead bears against the PTC.

9. A surge protector module for connection between outside plant and inside wiring to protect insider wiring and equipment from surges and excessive currents comprising:

a housing having a first pair of terminals for connection of outside plant wiring and a second pair of terminals for connection of inside wiring;

a three element gas tube located in the housing;

two leads, each having a first end connected to the gas tube and a second end connected to a respective one of the terminals of the first pair;

at least one MOV connected electrically in parallel with the gas tube;

at least one PTC resistor located in electrical contact between a respective one of the leads and a respective one of the terminals of the second pair; and at least one fusible element that will short to ground upon reaching a threshold temperature and wherein the PTC resistor is located such that heat from the PTC resistor is conducted along the lead to the at least one fusible element.

* * * * *